(12) United States Patent
Park et al.

(10) Patent No.: US 11,161,089 B2
(45) Date of Patent: Nov. 2, 2021

(54) MOISTURE ADSORPTION COMPOSITION, A METHOD OF PREPARING THE SAME, AND A SURFACE COATING INCLUDING THE SAME

(71) Applicant: KOREA INSTITUTE OF INDUSTRIAL TECHNOLOGY, Cheonan-si (KR)

(72) Inventors: Jea Sung Park, Cheonan-si (KR); In Park, Seoul (KR); Oh Kyung Kwon, Asan-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 719 days.

(21) Appl. No.: 15/750,613

(22) PCT Filed: Sep. 28, 2016

(86) PCT No.: PCT/KR2016/010844
§ 371 (c)(1),
(2) Date: Feb. 6, 2018

(87) PCT Pub. No.: WO2017/061726
PCT Pub. Date: Apr. 13, 2017

(65) Prior Publication Data
US 2019/0022622 A1 Jan. 24, 2019

(30) Foreign Application Priority Data

Oct. 5, 2015 (KR) .................. 10-2015-0139906
May 30, 2016 (KR) .................. 10-2016-0066528

(51) Int. Cl.
*B01J 20/04* (2006.01)
*B01J 20/32* (2006.01)
*B01J 20/30* (2006.01)
*C09D 163/00* (2006.01)
*C09D 7/63* (2018.01)
*C09D 7/40* (2018.01)
*C09D 5/00* (2006.01)
*C08K 13/04* (2006.01)

(52) U.S. Cl.
CPC ......... *B01J 20/046* (2013.01); *B01J 20/3021* (2013.01); *B01J 20/3078* (2013.01); *B01J 20/3212* (2013.01); *C09D 5/00* (2013.01); *C09D 7/40* (2018.01); *C09D 7/63* (2018.01); *C09D 163/00* (2013.01); *B01J 2220/42* (2013.01); *C08K 13/04* (2013.01)

(58) Field of Classification Search
CPC .. B01J 20/046; B01J 20/3021; B01J 20/3078; B01J 20/3212; C09D 7/63; C09D 5/00; C08K 13/04
See application file for complete search history.

(56) References Cited

U.S. PATENT DOCUMENTS 10,644,350 B2 * 5/2020 Chang .................. B01J 20/3085

FOREIGN PATENT DOCUMENTS

| KR | 10-0803945 B1 | 2/2008 | |
|---|---|---|---|
| KR | 10-2008-0112382 A | 12/2008 | |
| KR | 10-2011-0019804 A | 3/2011 | |
| KR | 10-1253985 B1 | 4/2013 | |
| KR | 101253985 B1 * | 4/2013 | ............. B01J 20/18 |
| KR | 10-1509690 B1 | 4/2015 | |
| KR | 10-2015-0107947 A | 9/2015 | |
| KR | 10-2015-0126487 A | 11/2015 | |

OTHER PUBLICATIONS

Djaeni et al., Proceeding of the 1st International Conference on Material Engineering (ICME), Nov. 25-26, 2010, Yogyakarta Indonesia.*
Satoshi Horike et al., "Postsynthesis Modification of a Porous Coordination Polymer by LICI to Enhance H+ Transport", Journal of the American Chemical Society, 2013, pp. 4612-4615, vol. 135.

* cited by examiner

Primary Examiner — Yong L Chu
(74) Attorney, Agent, or Firm — Rabin & Berdo, P.C.

(57) ABSTRACT

A moisture adsorption composition that is a vacuum dried powder, that is a metal chloride-impregnated, nanoporous material including a crystallization reaction product of an aluminum precursor and a dicarboxylic acid organic ligand having an average particle diameter of 100 to 2,000 nm, a pore size of 0.6 to 1.7 nm, and a maximum moisture adsorption amount of from 0.2 to 0.9 g/g within a driving pressure ($P/P_0$) that ranges from 0.1 to 0.3. The composition is prepared by synthesizing the nanoporous material by a crystallization reaction between the aluminum precursor and the dicarboxylic acid organic ligand; heat-treating to purify the nanoporous material; impregnating the nanoporous material by mixing with a metal chloride solution in water having a weight ratio of the metal chloride to the nanoporous material of 10:2.5 to 10:50; drying the mixture; crushing the dried product; and vacuum drying the crushed product to provide the moisture adsorption composition.

14 Claims, 10 Drawing Sheets

MOISTURE ADSORPTION COMPOSITION, A METHOD OF PREPARING THE SAME, AND A SURFACE COATING INCLUDING THE SAME

BACKGROUND OF THE INVENTION

Field of the Invention

The present invention relates to a moisture adsorption composition and, more particularly, to a preparation method of an organic-inorganic nanoporous material-metal chloride hybrid moisture adsorption composition formed by impregnating the surface of an organic-inorganic nanoporous material with a metal chloride, the moisture adsorption composition prepared by the preparation method, and a use thereof.

More specifically, the present invention relates to a preparation method of an organic-inorganic nanoporous material-metal chloride hybrid moisture adsorption composition which is prepared by impregnating a metal salt in pores of an organic-inorganic nanoporous material formed of aluminum having fumarate coordinate bonded thereto and which has a maximum moisture adsorption amount of 0.4 g/g or more in a driving pressure range of a dehumidifier, a moisture adsorption type refrigerator, a cooling and heating device and others, the moisture adsorption composition prepared by the preparation method, and a moisture adsorption composition for surface coating comprising the moisture adsorption composition.

Related Art

Effective utilization of energy has currently become a key issue all over the world. Particularly, researches on technologies for using various industrial waste heats generated in industrial fields are actively being conducted. Although the industrial waste heats exist in various forms, most of the industrial waste heats have been discarded without being reused.

An adsorption type refrigeration system as a method of effectively utilizing energies of the waste heats has been receiving a great deal of attention. From the beginning of the 1980s, the refrigeration system using adsorption has been utilizing natural refrigerants such as water, alcohol, ammonia and the like, and adsorbents such as silica gel, zeolite, activated carbon and the like. In 1986, a 17 kW-grade adsorption type refrigerator using silica gel/water was commercialized in Japan. Currently, Nishiyodo Kuchouki, Co., Ltd and Mayekawa Manufacturing Co., Ltd have been selling 70 to 500 kW-grade adsorption type refrigerators in Japan after the commercialization thereof, and SorTech AG of Germany has been selling 7.5 kW-grade and 15 kW-grade cooling systems associated with solar heat after the development thereof.

The adsorption type refrigeration system is an eco-friendly system which can use waste heats discarded from respective processes as a driving source, and which is not related to the destruction of the ozone layer by using water as the refrigerant. Although silica gel and water are used in an existing commercialized adsorption type refrigeration system, the silica gel tends to begin the adsorption at a low water vapor partial pressure due to its strong hydrophilicity. Further, in a driving pressure range ($P/P_0$=0.1 to 0.3) of the adsorption type refrigeration system, an adsorption speed is slow, desorption is not easy, and an amount of water adsorbed per each unit adsorbent is significantly low as about 0.1 g-water/g-sorbent (g-water/g-sorbent: the number of grams of water sorbed per 1 g of the sorbent). Further, moisture adsorbents used in commercialized desiccant type dehumidifier, an adsorption type heat pump, a dehumidifying rotor, a cooling and heating device, and the like mostly include porous silica and zeolite. The moisture adsorbents with such a composition have low moisture adsorption rates and reach the limit of a moisture adsorption amount. Therefore, research and development on a noble moisture adsorbent which is capable of replacing the moisture adsorbents are required. Namely, in order to improve performance of an apparatus including the adsorption type refrigeration system, the desiccant type dehumidifier, the adsorption type heat pump and the like and reduce maintenance costs of the apparatus, research and development on a noble moisture adsorption composition with a higher water adsorption amount within the driving pressure range are required.

Meanwhile, the organic-inorganic nanoporous material has been receiving attention as material which is capable of replacing the silica gel or zeolite that is a porous structure. Generally, metal easily generates coordination compounds at room temperature with an organic ligand having an unshared electron pair. The coordination compounds are polymerized under water or an organic solvent to form a three-dimensional skeleton structure, the compounds are generally called as "metal-organic frameworks (MOF)", and some of the compounds are also called as "organic-inorganic nanoporous material" since those compounds have nano-sized pores while forming the three-dimensional skeleton structure. In addition, it is reported that the organic-inorganic nanoporous material can be applied to various fields by modifying structure of the organic-inorganic nanoporous material according to coordination number of metal ions and types of organic ligand compounds, and the organic-inorganic nanoporous material has a surface area that is maximally 3 to 15 times larger than zeolite. Also, the organic-inorganic nanoporous material has an advantage of easily giving reactivity and adsorption selectivity since an unsaturated metal ion site which does not exist in zeolite formed of inorganic metals exists in the organic-inorganic nanoporous material.

In relation to this, Korean Patent Registration No. 10-0803945 (Title of the invention: organic-inorganic porous adsorbent for moisture adsorption and preparation method thereof, hereinafter referred to as prior art 1) provides a moisture adsorbent using a copper-containing porous organic-inorganic hybrid material, the moisture adsorbent which is prepared by a reaction between a copper precursor and terephthalic acid or benezenetricarboxyl acid as an organic ligand at a condition that an acid, a base, or a salt thereof is not added such that the moisture adsorbent has a surface area of more than 1,000 m$^2$/g to less than 10,000 m$^2$/g and a pore volume of more than 0.7 mL/g to less than 10 mL/g, and by which 80 wt % or more of adsorbed moisture is desorbed at a moisture desorption temperature of 60 to 100° C. within 5 minutes.

Further, in relation to this, Korean Patent Publication No. 2011-0019804 (hereinafter referred to as prior art 2), which relates to a preparation method of an organic-inorganic hybrid nanoporous material and an adsorbent application of the organic-inorganic hybrid nanoporous material, provides a preparation method of the organic-inorganic hybrid nanoporous material, i.e., MOF by making an aluminum salt as an aluminum precursor react with tri(C1-C7)alkyl-1,3,5-benzenetricarboxylate as an organic ligand, and discloses a method of synthesizing a pure organic-inorganic hybrid nanoporous material by increasing solubility and improving crystallinity accordingly using tri(C1-C7)alkyl-1,3,5-benzenetricarboxylate as the organic ligand, and uses of the prepared organic-inorganic hybrid nanoporous material as an adsorbent of various gases, moistures and the like.

Although the prior art 1 provides a technology relating to synthesis of the organic-inorganic hybrid nanoporous material with improved crystallinity and uses of the organic-inorganic hybrid nanoporous material as the adsorbent, the prior art 1 has not disclosed specifications required for substantially applying the adsorbent, or a technology for manufacturing the prepared organic-inorganic hybrid nanoporous material into an industrially applicable form.

SUMMARY OF THE INVENTION

Although the organic-inorganic porous adsorbent according to the prior art 1 discloses a configuration for the moisture adsorbent using the copper-containing porous organic-inorganic hybrid material and the preparation method thereof, the organic-inorganic porous adsorbent according to the prior art 1 has a problem that it is difficult to overcome the limitations of moisture adsorption properties only by the organic-inorganic porous adsorbent. In addition, although the moisture adsorbent should have excellent moisture adsorption properties in the driving pressure range of the adsorption type refrigerator, the cooling and heating device, the dehumidifier and the like to which the moisture adsorbent is applied, there has been a problem that the moisture adsorbent according to the prior art 1 has moisture adsorption properties that are not suitable for industrial applications.

Therefore, an objective of the present invention is to provide an organic-inorganic nanoporous material-metal chloride hybrid moisture adsorption composition having improved moisture adsorption properties by impregnating the surface of an organic-inorganic nanoporous material with a metal chloride. Furthermore, another objective of the present invention is to provide a moisture adsorption composition which exhibits more effective moisture adsorption properties in the driving pressure range of the adsorption type refrigerator, the cooling and heating device, the dehumidifier and the like to enable industrial applications of the moisture adsorption composition, and a preparation method of the moisture adsorption composition.

Furthermore, another objective of the present invention is to provide a technology relating to a moisture adsorption composition for surface coating comprising the organic-inorganic nanoporous material-metal chloride hybrid moisture adsorption composition.

The technical problem to be solved by the present invention is not limited to above-mentioned technical problems, and another technical problems that have not been mentioned shall be clearly understood to a person skilled in the art in the technical field to which the present invention belongs from the description below.

In order to accomplish the above objectives, an embodiment of the present invention provides a preparation method of an organic-inorganic nanoporous material-metal chloride hybrid moisture adsorption composition. According to exemplary embodiments of the present invention, provided is a preparation method of the organic-inorganic nanoporous material-metal chloride hybrid moisture adsorption composition, the preparation method comprising the steps of i) synthesizing an organic-inorganic nanoporous material by a crystallization reaction between an aluminum precursor and a dicarboxylic acid organic ligand, ii) dissolving a metal chloride into water to prepare a metal chloride solution, iii) mixing the metal chloride solution with the organic-inorganic nanoporous material to impregnate the surface of the organic-inorganic nanoporous material with the metal chloride, iv) drying a mixture of the step iii) in an oven of 100 to 200° C. for a predetermined time, v) crushing a product on which a drying process has been performed in the step iv), and vi) preparing the moisture adsorption composition by vacuum drying a powder produced after completing the step v).

In order to accomplish the above objectives, another embodiment of the present invention provides a preparation method of an organic-inorganic nanoporous material-metal chloride hybrid moisture adsorption composition which is prepared by comprising the step i) of synthesizing the organic-inorganic nanoporous material, the step i) including the steps of i-a) mixing a solvent, a dicarboxylic acid organic ligand and an aluminum precursor such that 4 to 40 wt % of the aluminum precursor and 1 to 10 wt % of the dicarboxylic acid organic ligand are mixed with the solvent with respect to the solvent, i-b) stirring a mixture of the step i-a) and then carrying out a crystallization reaction of the aluminum precursor and the dicarboxylic acid organic ligand at a temperature of 100 to 150° C. for a predetermined time, i-c) primarily filtering a product having the reaction completed in the step i-b) and dispersing the primarily filtered product in water to sonicate the product dispersed in water, i-d) secondly filtering a dispersion of the step i-c), and i-e) drying a filtrate obtained through the second filtration process to obtain an organic-inorganic nanoporous material in a powder form.

Another embodiment of the present invention provides an organic-inorganic nanoporous material-metal chloride hybrid moisture adsorption composition comprising an organic-inorganic nanoporous material synthesized by the crystallization reaction of the aluminum precursor and the dicarboxylic acid organic ligand, and a metal chloride impregnated in pores located in the surface of the organic-inorganic nanoporous material, wherein the organic-inorganic nanoporous material has an average particle diameter of 100 to 2,000 nm, the pores have a size of 0.6 to 1.7 nm, and the organic-inorganic nanoporous material-metal chloride hybrid moisture adsorption composition has a maximum moisture adsorption amount (the amount of moisture adsorbed per unit weight of the adsorption composition) of 0.2 to 0.9 g/g in the driving pressure range ($P/P_0$=0.1 to 0.3).

The preparation method of the moisture adsorption composition according to an embodiment of the present invention has: a first effect that the preparation method of the moisture adsorption composition according to an embodiment of the present invention facilitates preparation of the moisture adsorption composition compared to a conventional preparation method of a moisture adsorption composition including porous zeolite;

a second effect that the moisture adsorption composition prepared according to the present invention has industrially useful moisture adsorption properties since the moisture adsorption composition prepared according to the present invention has a maximum moisture adsorption amount in the driving pressure range ($P/P_0$=0.1 to 0.3) of an adsorption type cooling and heating device, a refrigerator, a dehumidifier, and the like by impregnating the metal chloride in the pores of the organic-inorganic nanoporous material having a large surface area to prepare the organic-inorganic nanoporous material-metal chloride hybrid moisture adsorption composition, thereby improving moisture adsorption properties compared to a moisture adsorption composition formed of a single material; and a third effect that the preparation method can improve process efficiency and can reduce production cost by preparing the moisture adsorption composition easily.

In relation to the first effect, the preparation method enables the moisture adsorption composition to be easily prepared by using as the moisture adsorption composition the organic-inorganic nanoporous material that is prepared easily than zeolite and has moisture adsorption properties equal to or higher than those of zeolite.

Further, the organic-inorganic nanoporous material forms a porous structure similar to that of zeolite, and the organic-inorganic nanoporous material has an advantages that efficiency of a preparation process of the moisture adsorption composition can be improved since fewer types raw materials are used, and production time is short when preparing the organic-inorganic nanoporous material.

In relation to the second effect, the moisture adsorption composition may have a fast moisture adsorption rate and a high moisture adsorption amount in the driving pressure range of an apparatus including the moisture adsorbent such as the adsorption type refrigerator, the dehumidifier, the cooling and heating device and the like by impregnating the surface of the organic-inorganic nanoporous material having moisture adsorption properties with the metal chloride having hygroscopic property, thereby maximizing the moisture adsorption properties.

Further, in relation to the third effect, the preparation process is reduced as in the first effect such that the process efficiency can be improved, and production cost can be reduced accordingly.

Effects of the present invention are not limited to the above-described effects, but should be understood to include all effects that can be deduced from features of inventions described in the detailed description or the claims of the present invention.

DESCRIPTION OF EXEMPLARY EMBODIMENTS

Figure 1:
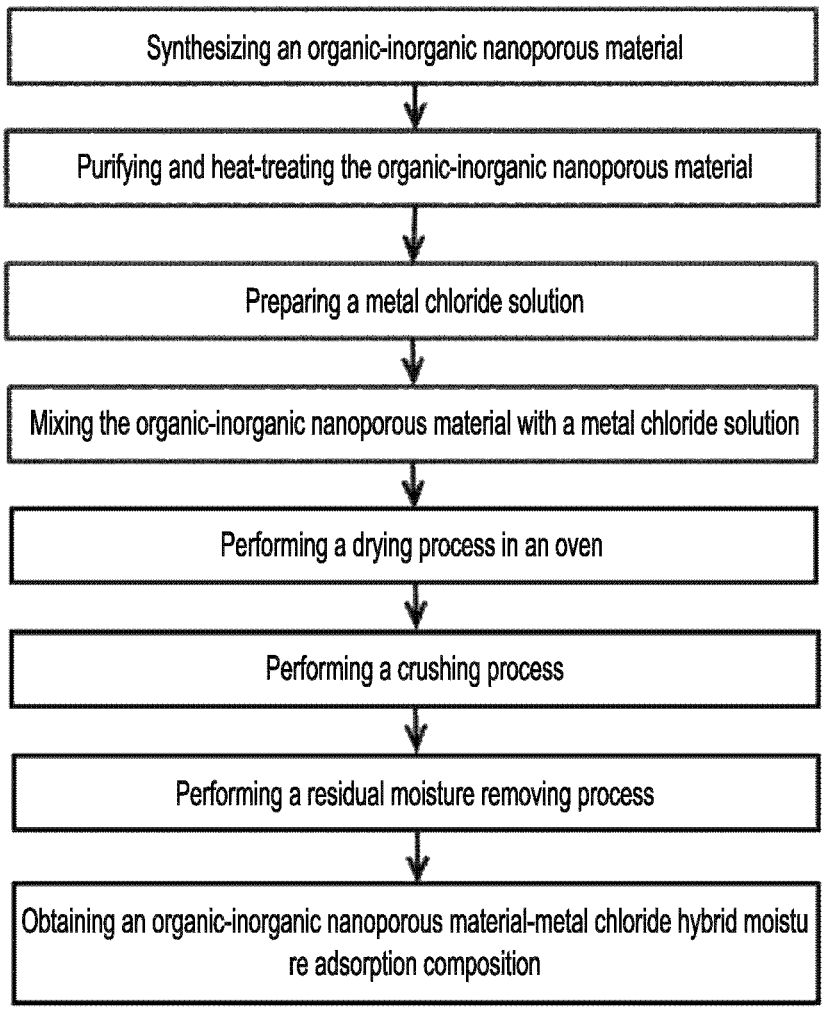
FIG. 1 is a flowchart illustrating a preparation method of an organic-inorganic nanoporous material-metal chloride hybrid moisture adsorption composition according to an embodiment of the present invention.

Hereinafter, the present will be described with reference to the accompanying drawings. However, the present invention may be implemented in various forms and not limited to the embodiments described herein accordingly. In the accompanying drawings, portions unrelated to the description will be omitted in order to obviously describe the present invention, and similar reference numerals will be used to describe similar portions throughout the present specification.

It will be understood throughout this specification that when a part is referred to as being "connected (accessed, contacted or coupled)" to another part, it can be "directly connected" to the other part or may be "indirectly connected" to the other element with member(s) interposed therebetween. Also, when a part is referred to as "including" an element, other elements may be further included not excluded unless there is any other particular mention on it.

The terms used in the present specification are intended to merely describe specific embodiments, but not intended to limit the present invention. The expression in the singular form in the present specification will cover the expression in the plural form unless otherwise indicated obviously from the context. The terms such as "include" and "have" are intended to indicate that features, numbers, steps, operations, elements, components, or combinations thereof used in the specification exist and it should thus be understood that the possibility of existence or addition of one or more other different features, numbers, steps, operations, elements, components, or combinations thereof is not excluded.

FIG. 1 is a flowchart illustrating a preparation method of an organic-inorganic nanoporous material-metal chloride hybrid moisture adsorption composition according to an embodiment of the present invention.

The present invention provides a preparation method of the organic-inorganic nanoporous material-metal chloride hybrid moisture adsorption composition, the preparation method comprising the steps of i) synthesizing an organic-inorganic nanoporous material, ii) dissolving a metal chloride into water to prepare a metal chloride solution, iii) mixing the metal chloride solution with the organic-inorganic nanoporous material to impregnate the surface of the organic-inorganic nanoporous material with the metal chloride, iv) drying a mixture of the step iii), v) crushing a product on which a drying process has been performed in the step iv), and vi) preparing the moisture adsorption composition by vacuum drying a powder produced after crushing the dried product.

Hereinafter, the present invention will be described by a method of explaining the respective production steps in detail.

The step i) of the present invention is a step of synthesizing the organic-inorganic nanoporous material. In an embodiment of the present invention, the organic-inorganic nanoporous material may be prepared by including the steps of i-a) mixing a solvent, a dicarboxylic acid organic ligand and an aluminum precursor at a predetermined ratio, i-b) stirring a mixture of the step i-a) and then carrying out a crystallization reaction of the aluminum precursor and the organic ligand at a predetermined temperature, i-c) primarily filtering a product having the reaction completed in the step i-b) and dispersing the primarily filtered product in water to sonicate the product dispersed in water, i-d) secondly filtering a dispersion of the step i-c), and i-e) drying a filtrate obtained through the step of performing the second filtration process to obtain an organic-inorganic nanoporous material in a powder form.

In an embodiment of the present invention, although the solvent of the step i-a) may be a solvent selected from the group consisting of water, an alcohol-based solvent, dimethylformamide, diethylformamide, N,N-dimethylformamide, acetonitrile, 1,4-dioxane, chlorobenzene, N-methyl pyrrolidone and tetrahydrofuran, or a mixed solvent including two or more thereof, the solvent is not limited. Preferably, the solvent may include one or more solvents selected from water, dimethylformamide, N,N-dimethylformamide, and tetrahydrofuran.

Further, it is specified in an embodiment of the present invention that the aluminum precursor of the step i-a) may include one or more compounds selected from aluminum nitrate, aluminum chloride, aluminum sulfate and alumina, and may also include aluminum nitrate, aluminum chloride and aluminum sulfate in the form of hydrates.

Further, the dicarboxylic acid organic ligand of the step i-a) in an embodiment of the present invention may be isophthalic acid or fumaric acid. The organic ligand is also referred to as a linker, and the organic ligand may include any organic compounds having binding sites that are capable of being coordinated such as $-CO_2-$, $CS_2-$, $-SO_3-$ and $-N$ serving as a chelate with respect to metal ions. However, it may be preferable to use an organic ligand having two or more binding sites to induce a stable metal-organic framework.

The isophthalic acid may be preferable as the organic ligand since the isophthalic acid is a structure in which carboxylic acid is bonded to number 1 and number 3 locations of a benzene ring, the isophthalic acid has characteristics that the isophthalic acid is coordinated to aluminum ions by carboxylic acid, and the isophthalic acid forms a stable porous structure in a state that the isophthalic acid is coordinated to aluminum ions under a predetermined temperature condition. The isophthalic acid is bonded to aluminum ions of the aluminum precursor through a crystallization reaction, and may have excellent properties as the moisture adsorption composition by forming a metal-organic framework of a crystal structure with a high surface area and a very high regularity.

The fumaric acid can form a nanoporous material which can be produced more environmentally friendly and which is more solid by enabling the reaction to be performed in the water.

In an embodiment of the present invention, a mole ratio of the aluminum precursor to the fumaric acid may be in a range of 10:2.5 to 10:40. When the mole ratio is formed within the range, average sizes of the organic-inorganic nanoporous material and pores may be controlled to obtain desired moisture adsorption properties.

In an embodiment of the present invention, the reaction may be performed under the presence of a basic material in the step i), and a crystal which is more solid and uniform may be formed by adding the basic material, thereby controlling the crystallization reaction. Specifically, it is specified that the basic material may include sodium hydroxide, urea and the like, but the basic material is not limited thereto.

It is specified that the step i-b) of the present invention may be performed in a temperature range of 100 to 200° C. for a predetermined time, and the step i-b) is not limited thereto. However, there is a problem that process efficiency is deteriorated due to a long reaction time since the reaction rate is slow when a crystallization reaction temperature is less than 100° C. When the crystallization reaction temperature exceeds 200° C., it may be difficult to form an organic-inorganic nanoporous material of a desired condition since material without pores is formed, and there may be a problem that purity is lowered since a fast reaction rate facilitates mixing of impurities. At this time, the step i-b) can be performed by hydrothermal synthesis, solvent synthesis or microwave irradiation method through electric heating. When performing the crystallization reaction using a microwave synthesis apparatus, there may be advantages that a structure with even physical properties can be synthesized, and synthesis time can be greatly reduced by uniformly transferring heat into a reactant.

The step i-c) in the present invention is a step of putting a coupling structure of the aluminum precursor and the organic ligand formed in the step i-b) into water and spraying ultrasonic waves onto the coupling structure of the aluminum precursor and the organic ligand, thereby uniformly dispersing the coupling structure of the aluminum precursor and the organic ligand in water. The step i-c) enables the surface of the organic-inorganic nanoporous material to be uniformly impregnated with the metal chloride in the step described later.

Further, the step i-d) and the step i-e) in the present invention may increase purity by removing unreacted materials or solvents. However, temperature of a drying step in the step i-e) may be 100 to 200° C. Evaporation of the solvent may be insufficient when the temperature of the drying step is less than 100° C., and it may be not preferable since there is a problem that unnecessary energy is used when the temperature of the drying step exceeds 200° C.

At this time, particles of the organic-inorganic nanoporous material prepared in the step i) have an average size of 100 to 20,000 nm, and pores of the organic-inorganic nanoporous material may have an average diameter of 0.3 to 1.5 nm. The smaller particle sizes of a moisture adsorption porous body become, the larger specific surface area of the moisture adsorption porous body is. Therefore, the moisture adsorption porous body tends to increase a moisture adsorption amount per unit weight of the moisture adsorption composition. It may be difficult to uniformly disperse the moisture adsorption porous body in the solvent since agglomeration properties between particles are increased while surface energy of the moisture adsorption porous body is being increased when the particle sizes are excessively small. In addition, when the particle sizes exceed 20,000 nm, it may be limited to improve moisture adsorption properties in a desired driving pressure range since the specific surface area is decreased.

Further, the organic-inorganic nanoporous material has a plurality of nano-sized pores due to regular bonding of the metal ions and the organic ligand, and the organic-inorganic nanoporous material has characteristics that gas molecules including moisture can be adsorbed in the nano-sized pores. Therefore, since the moisture adsorption composition has an increased specific surface area when sizes of the pores formed in the organic-inorganic nanoporous material are decreased, the moisture adsorption amount per unit weight of the moisture adsorption composition and the moisture adsorption rate can be maximized. For this reason, the smaller sizes the pores provided in particles of the organic-inorganic nanoporous material have, the more advantageous properties the organic-inorganic nanoporous material as the moisture adsorption composition tends to exhibit. However, the pore sizes may not be preferable when the pores sizes are less than 0.3 nm, since excessively small pore sizes may deteriorate moisture adsorption performance by deteriorating moisture permeability, and may influence on impregnation of the metal chloride. It may be limited to realize moisture adsorption performance for the purpose of reducing the specific surface area when the pores sizes exceed 1.5 nm.

Next, the step ii) of the present invention is a step of fully dissolving the metal chloride into water to prepare the metal chloride solution. In order to fully dissolve the metal chloride within a short time, it may be preferable to stir the metal chloride at a predetermined speed, or heat the metal chloride while stirring the metal chloride. At this time, when a subsequent step is performed in a state that the metal chloride is not fully dissolved in water, it may be difficult to prepare a moisture adsorption composition with excellent moisture adsorption properties since impregnation efficiency of the metal chloride is deteriorated.

The metal chloride of the step ii) may include one or more deliquescent compounds selected from the group consisting of calcium chloride ($CaCl_2$), magnesium chloride ($MgCl_2$), lithium chloride (LiCl), zinc chloride ($ZnCl_2$), potassium chloride (KCl), and sodium chloride (NaCl).

In addition, the preparation method according to an embodiment of the present invention may further comprise the step of heat-treating the organic-inorganic nanoporous material produced in the step i) at a temperature of 200 to 400° C. for 30 to 360 minutes between the step i) and the step ii). This enables a high purity organic-inorganic nanoporous material to be obtained by removing unreacted materials, solvent components, by-products and the like which have not been removed in advance through drying and filtration processes.

Next in the step iii) of the present invention, the metal chloride can be impregnated in the surface of the organic-inorganic nanoporous material by mixing the organic-inorganic nanoporous material with the metal chloride solution. An effect of maximizing moisture adsorption capacity may be expected from the moisture adsorption composition according to the present invention by impregnating the metal chloride with deliquescence in the surface of an organic-inorganic nanoporous material with excellent adsorption properties, thereby combining adsorption capability with hygroscopicity.

Next, the step iv) of the present invention is a step of drying the mixture of the step iii) under a predetermined temperature condition. In an embodiment of the present invention, the step iv) may be performed in an oven of 100 to 200° C. for a predetermined time, and an oven drying process is carried out in the step iv) such that water as the solvent can be removed. When the drying temperature is less than 100° C., there may be a problem that the process efficiency is deteriorated as it takes a long time to evaporate the solvent. When the drying temperature exceeds 200° C., it is not preferable since stabilities of the organic-inorganic nanoporous material and the metal chloride may deteriorate to cause the material to be deformed.

Next, a product on which the drying process has been performed in the step iv) may be crushed in the step v) of the present invention. In general, the moisture adsorption composition tends to adsorb a larger amount of gas as a surface area of the moisture adsorption composition is getting increased. Therefore, in order to maximize moisture adsorption properties of the moisture adsorption composition, a process of crushing the product by a crusher for a predetermined time to produce a powder may be performed.

Next, the moisture adsorption composition can be prepared by vacuum drying the crushed powder in the step vi) of the present invention. The step vi) can further improve the moisture adsorption properties of the moisture adsorption composition by completely removing residual moisture included in the moisture adsorption composition through a vacuum dryer.

Hereinafter, a mixing ratio of materials constituting the moisture adsorption composition will be described.

The organic-inorganic nanoporous material according to the present invention may be prepared by mixing the aluminum precursor and the dicarboxylic acid organic ligand with the solvent. Preferably, the organic-inorganic nanoporous material may be prepared by comprising 4 to 40 wt % of the aluminum precursor and 1 to 10 wt % of the dicarboxylic acid organic ligand with respect to 100 parts by weight of the solvent.

In the present invention, the organic-inorganic nanoporous material may be mixed in an amount of 5 to 50 wt % with respect to 100 parts by weight of the metal chloride solution.

However, it may be preferable in the present invention that 25 to 50 wt % of the organic-inorganic nanoporous material is mixed with respect to 100 parts by weight of the metal chloride solution.

However, if the metal chloride solution is excessively added when preparing the moisture adsorption composition since the content of the metal chloride that can be impregnated in the organic-inorganic nanoporous material is limited, the pores of the organic-inorganic nanoporous material may be closed such that moisture adsorption properties of the organic-inorganic nanoporous material may be rather deteriorated. Accordingly, the excessive amount of the metal chloride solution generates a problem that it is also disadvantageous to reuse the organic-inorganic nanoporous material as well as a problem that an effect of increasing moisture adsorption properties that can be obtained compared to an addition amount may be insignificant since adsorbed moisture is not desorbed easily. Further, if the content of the metal chloride solution is small compared to the organic-inorganic nanoporous material, there may be a problem that it is not possible to sufficiently secure an enhancement effect of moisture adsorption properties induced by combining the organic-inorganic nanoporous material having adsorption properties with the metal chloride having hygroscopicity.

The moisture adsorption composition prepared through the preparation method may have a maximum moisture adsorption amount (the amount of moisture adsorbed per unit weight of the adsorption composition) of 0.2 to 0.9 g/g in the driving pressure range ($P/P_0$=0.1 to 0.3). This may be a driving pressure range suitable for an adsorption unit of an adsorption type refrigerator, a heater, a dehumidifier, an air conditioner and the like. Therefore, the moisture adsorption composition according to the present invention is provided in the adsorption unit of the above-mentioned devices such that the moisture adsorption composition can improve moisture adsorption properties.

Further, the moisture adsorption composition prepared according to the present invention is formed by impregnating the metal chloride in the surface of the organic-inorganic nanoporous material, and the organic-inorganic nanoporous material is a metal-organic framework formed by including the aluminum ions and the carboxylic acid organic ligand coordinated to the aluminum ions.

The organic-inorganic nanoporous material-metal chloride hybrid moisture adsorption composition prepared according to the preparation method of the present invention comprises an organic-inorganic nanoporous material synthesized by a crystallization reaction of the aluminum precursor and the dicarboxylic acid organic ligand, and a metal chloride impregnated in the pores located in the surface of the organic-inorganic nanoporous material. The organic-inorganic nanoporous material may have an average particle diameter of 100 to 2,000 nm, a pore size of 0.3 to 1.7 nm, and a maximum moisture adsorption amount (the amount of moisture adsorbed per unit weight of the adsorption composition) of 0.2 to 0.9 g/g in the driving pressure range ($P/P_0$=0.1 to 0.3).

In another embodiment of the present invention, the organic-inorganic nanoporous material-metal chloride hybrid moisture adsorption composition prepared according to the preparation method of the present invention may be an organic-inorganic nanoporous material-metal chloride hybrid moisture adsorption composition in which the dicarboxylic acid organic ligand is fumaric acid, and the organic-inorganic nanoporous material has a pore size of 0.3 to 1.5 nm and a maximum moisture adsorption amount (the amount of moisture adsorbed per unit weight of the adsorption composition) of 0.4 g/g or more in the driving pressure range ($P/P_0$=0.1 to 0.3).

As particle sizes of a porous organic-inorganic nanoporous material applied to the moisture adsorption composition are decreased, the specific surface area of the organic-inorganic nanoporous material is increased such that a moisture adsorption amount of the organic-inorganic nanoporous material per unit weight of the moisture adsorption composition tends to increase. Therefore, the particle sizes of the organic-inorganic nanoporous material are not greatly limited. However, the particle sizes may cause deterioration of efficiency of the production process since it may be difficult to uniformly disperse particles of the organic-inorganic nanoporous material in an aqueous metal chloride solution, and an agglomeration effect between the particles is creased when the particle sizes are less than 100 nm. In addition, when the particle sizes of the organic-inorganic nanoporous material exceed 2,000 nm, it may be limited to maximize moisture adsorption performance in a desired driving pressure range since the specific surface area of the organic-inorganic nanoporous material is small.

Further, although it may be preferable that the pores located in the surface of the organic-inorganic nanoporous material have sizes of 0.6 to 1.7 nm, it is specified that the pore sizes are not limited thereto. The organic-inorganic nanoporous material has a plurality of nano-sized pores due to regular bonding of the metal ions and the organic ligand, and the organic-inorganic nanoporous material has characteristics that gas molecules including moisture can be adsorbed in the nano-sized pores. Therefore, since the moisture adsorption composition has an increased specific surface area when the sizes of the pores formed in the organic-inorganic nanoporous material are decreased, the moisture adsorption amount per unit weight of the moisture adsorption composition and the moisture adsorption rate can be maximized. For this reason, the smaller sizes the pores provided in the particles of the organic-inorganic nanoporous material have, the more advantageous properties the organic-inorganic nanoporous material as the moisture adsorption composition tends to exhibit. However, excessively small pore sizes may deteriorate moisture adsorption performance by deteriorating moisture permeability when the pores sizes are less than 0.3 nm, and it may be limited to realize moisture adsorption performance for the purpose of reducing the specific surface area when the pores sizes exceed 1.7 nm.

Moreover, an organic-inorganic nanoporous material-metal chloride hybrid moisture adsorption composition according to the present invention is mixed with a binder such that the organic-inorganic nanoporous material-metal chloride hybrid moisture adsorption composition can be prepared into a moisture adsorption composition for surface coating. Specifically, the moisture adsorption composition for surface coating may include 70 to 96 wt % of the organic-inorganic nanoporous material-metal chloride hybrid moisture adsorption composition prepared by the above-mentioned preparation method, 3 to 29 wt % of an epoxy-based binder resin, and 1 to 10 wt % of an epoxy curing agent.

The epoxy-based binder resin in the present invention gives coating properties to a substrate. Specifically, the epoxy-based binder resin may be selected from novolac epoxide, bisphenol A, bisphenol F, non-aromatic epoxide, alicyclic epoxide, glycidyl ester, and an epoxy functional acrylic resin. However, the epoxy-based binder resin is not limited thereto, and may include a urethane-based binder resin, an acryl-based binder resin, and the like. However, the epoxy-based binder resin may be preferable in terms of coating properties, compatibility with the moisture adsorption composition of the present invention, and costs.

Further, there may be a problem that coating properties and adhesion properties with respect to the substrate deteriorate when the epoxy-based binder resin in the present invention has a content of less than 3 wt %, it may be limited to achieve desired moisture adsorption properties since a ratio of the moisture adsorption composition is relatively reduced when the epoxy-based binder resin in the present invention has a content of greater than 29 wt %.

The curing agent in the present invention may be added to cure the epoxy-based binder resin such that the epoxy-based binder resin is coated on one side of the substrate. The curing agent can accelerate curing of the epoxy-based binder resin by coating the moisture adsorption composition for surface coating prepared by adding the curing agent on the substrate, applying heat to the moisture adsorption composition for surface coating or irradiating ultraviolet rays onto the moisture adsorption composition for surface coating. However, types of the curing agent are not limited thereto, and any materials used as the epoxy curing agent such as an amine-based agent, an acid anhydride-based curing agent, or the like can be used as the curing agent.

However, when the curing agent has a content of less than 1 wt %, the curing agent may cause problems that it is difficult to completely cure the composition for surface coating, and a curing time is increased. When the curing agent has a content of greater than 10 wt %, the curing agent may not be preferable since storage stability is lowered.

In addition, the moisture adsorption composition in the present invention may have a content of 70 to 96 wt %. When the content of the moisture adsorption composition is less than 70 wt %, there may be a problem that moisture adsorption properties deteriorate. When the content of the moisture adsorption composition exceeds 96 wt %, it may be difficult to secure surface coating properties as the content of the composition for surface coating is relatively decreased although excellent moisture adsorption properties may be obtained. Further, when the moisture adsorption composition for surface coating is prepared in an embodiment of the present invention, a solvent may be used to uniformly disperse solid particles such as the moisture adsorption composition in the composition. The solvent performs a role of evenly dispersing the solid particles in the solution, and relieves a phenomenon that the moisture adsorption composition of the present invention is agglomerated. The solvent is added since a difference between physical properties of respective local portions may be caused when a moisture adsorption material is prepared by coating the composition on the substrate if the moisture adsorption composition exists in a state that the moisture adsorption composition is agglomerated in the composition for surface coating. It is specified that the solvent may include water soluble polymers such as poly(ethylene glycol) methyl ether methacrylate (PEGMA), polyvinyl alcohol (PVA) and polyethylene glycol (PEG), but the solvent is not limited thereto. In addition, the solvent may be added in a weight corresponding to 0.1 to 4 times of 100 parts by weight of the moisture adsorption composition when preparing the moisture adsorption composition for surface coating.

In general, there has been a problem that moisture adsorption properties are remarkably deteriorated when mixing a moisture adsorption composition in a powder form with the composition for coating such as the binder. However, the moisture adsorption composition for surface coating comprising the organic-inorganic nanoporous material-metal chloride hybrid moisture adsorption composition according to the present invention is excellent by having a maximum moisture adsorption amount of 0.4 g/g or more in the driving pressure range ($P/P_0$=0.1 to 0.3). This will be specifically described in examples and experimental examples described later.

Hereinafter, examples and experimental examples are described.

Example 1

After mixing 10 ml of dimethylformamide (DMF) as a solvent with 40 ml of distilled water, 2.0 g of isophthalic acid was added to a mixed solution, and the mixed solution and isophthalic acid were stirred at a rotation speed of 1,000 rpm for 30 minutes. Next, after mixing the stirred material with 8.0 g of aluminum sulfate octadecahydrate ($Al_2(SO_4)_3 \cdot 18H_2O$), the mixture was stirred to a rotation speed of 1,000 rpm for 30 minutes to prepare a reactant. A reaction container containing the reactant was put into an oven, a crystallization reaction of the reactant was performed at 135° C. for 12 hours. After completing the reaction and cooling the reaction-completed material to room temperature, the cooled material was filtered to obtain a product. After putting the product into distilled water and strongly stirring the product in distilled water for 30 minutes, spraying ultrasonic waves onto the stirred material for 30 minutes to uniformly disperse the stirred material in distilled water to obtain an aqueous dispersion. The aqueous dispersion was filtered, and a resulting filtrate was dried at 100° C. for one hour to prepare an organic-inorganic nanoporous material powder (hereinafter referred to as Al-MOF).

Example 2

An organic-inorganic nanoporous material powder (hereinafter referred to as Al-MOF-300C) was obtained by further comprising a step of heat-treating an organic-inorganic nanoporous material powder prepared under the same conditions and by the same method as in Example 1 at 300° C. for 180 minutes, thereby sintering an organic material included in an organic-inorganic nanoporous material.

Experimental Example 1

Figure 2:
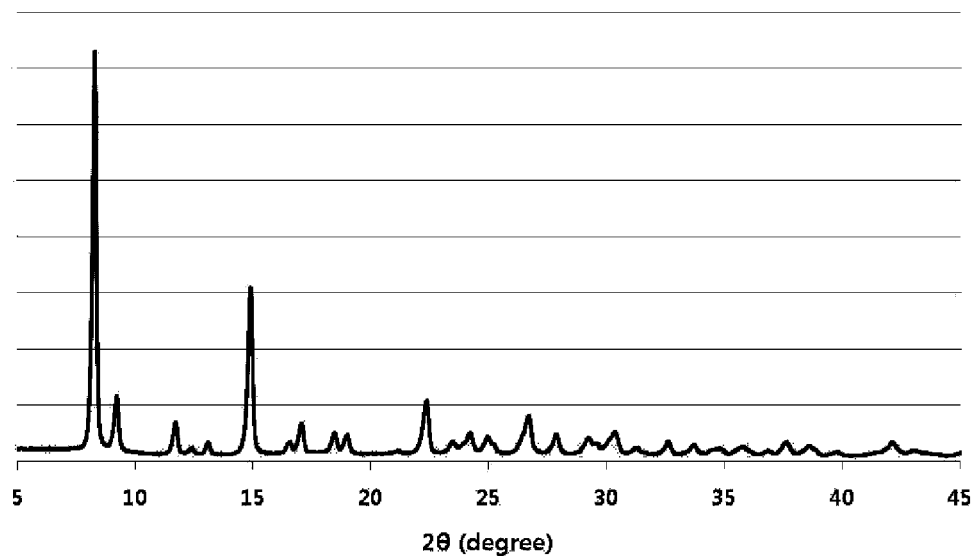
FIG. 2 is an X-ray diffraction spectrum of an organic-inorganic nanoporous material (Al-MOF-300C) prepared according to an embodiment of the present invention.

In order to analyze a crystal structure of an organic-inorganic nanoporous material prepared according to Example 2, an X-ray diffraction analysis was performed, and the X-ray diffraction analysis was carried out in the atmosphere of room temperature using an X-ray diffractometer of Rigaku Corporation. A result of the X-ray diffraction analysis is shown in FIG. 2. The X-ray diffraction analysis result is represented as a peak intensity with respect to a diffraction angle (2θ) in FIG. 2. A lattice constant and an axial angle of the organic-inorganic nanoporous material prepared according to the present invention were respectively derived as follows through the X-ray diffraction analysis:

Lattice constant: a=b=21.547, c=10.3780

Axial angle: α=β=γ=90°

(symbols a, b and c derived as the X-ray diffraction analysis result indicate X-, Y-, and Z-axis directional lengths of a unit lattice, and α, β, and γ indicate angles between X-axis, Y-axis and Z-axis).

Figure 3:
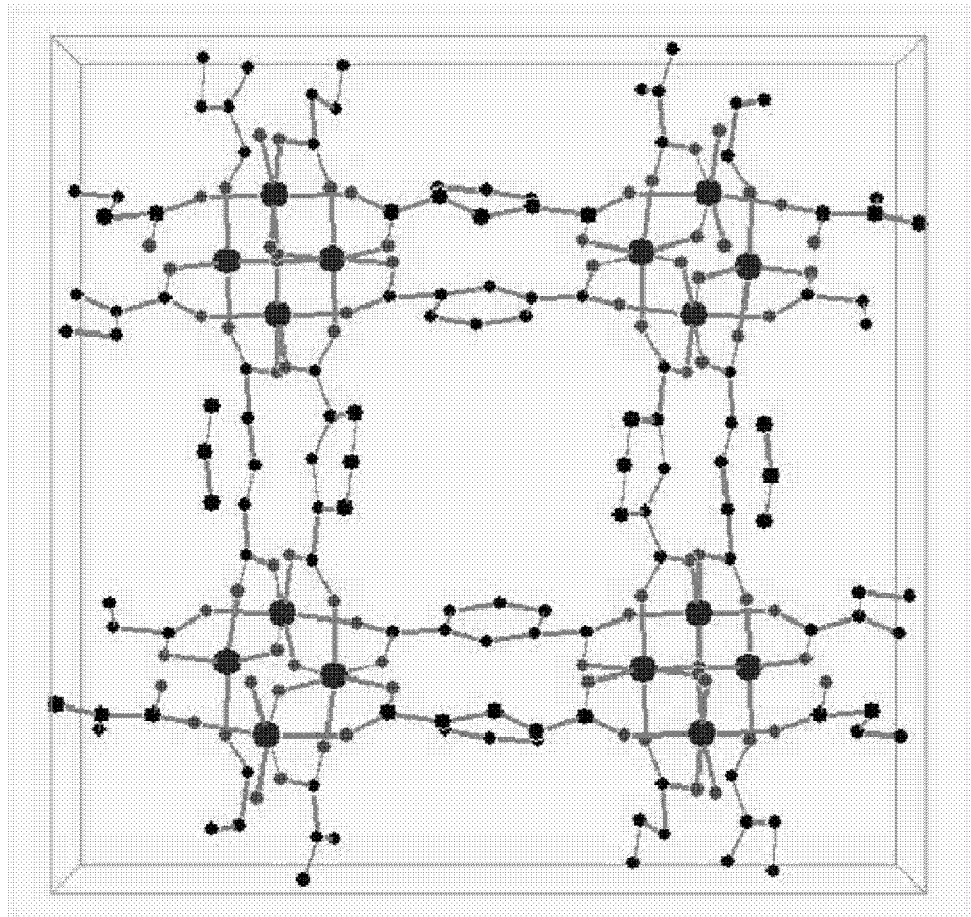
FIG. 3 illustrates a lattice structure of the organic-inorganic nanoporous material according to the present invention.

Further, the organic-inorganic nanoporous material prepared according to the present invention can be determined to be a tetragonal crystal structure through the X-ray diffraction analysis result, and a lattice structure of the organic-inorganic nanoporous material is illustrated in FIG. 3.

Experimental Example 2

Figure 4:
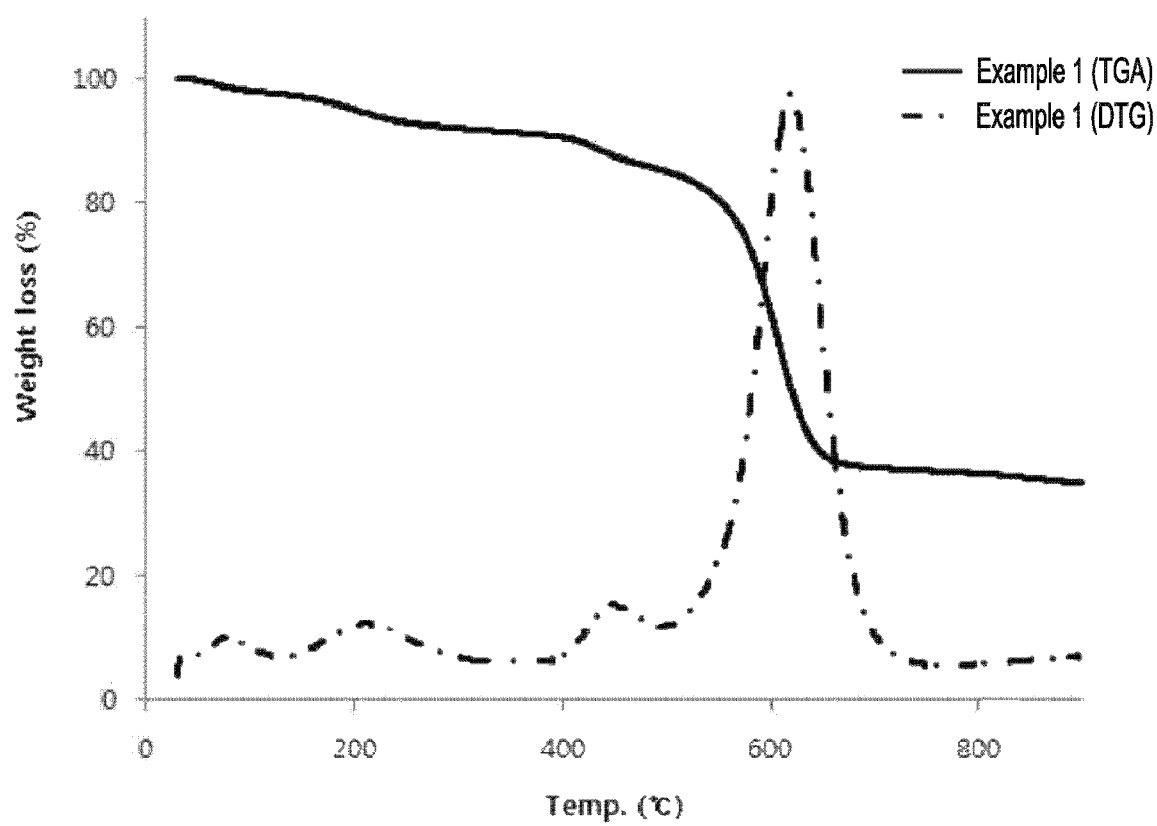
FIG. 4 is a graph illustrating thermogravimetric analysis (TGA) and derivative thermogravimetric analysis (DTG) of an organic-inorganic nanoporous material (Al-MOF) prepared according to an embodiment of the present invention.
Figure 5:
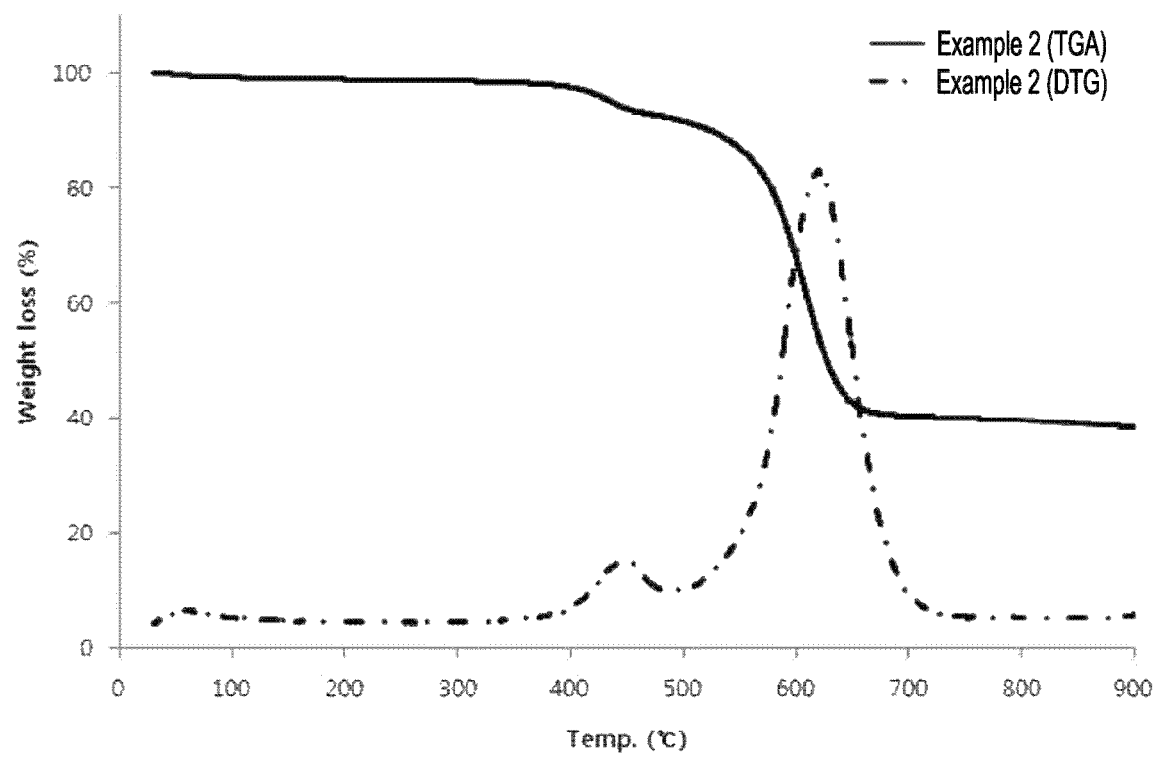
FIG. 5 is a graph illustrating thermogravimetric analysis (TGA) and derivative thermogravimetric analysis (DTG) of an organic-inorganic nanoporous material (Al-MOF-300C) prepared according to another embodiment of the present invention.

In order to analyze thermal behaviors of the organic-inorganic nanoporous materials prepared according to Example 1 and Example 2, thermogravimetric analysis (TGA) and derivative thermogravimetric analysis (DTG) were performed. Measurements were carried out at a temperature increasing rate of 10° C./min in a nitrogen atmosphere. Measurement results are shown in FIG. 4 and FIG. 5. FIG. 4 is a TGA result of the organic-inorganic nanoporous material according to Example 1, and FIG. 5 is a TGA result of the organic-inorganic nanoporous material according to Example 2.

Referring to this, it can be seen as results of TGA/DTG that the organic-inorganic nanoporous material (Al-MOF) according to Example 1 tends to show a decreased mass from the initial stage of a temperature increasing process, and about 20% of a mass loss is rapidly generated near 600° C. On the other hand, it can be seen as results of TGA/DTG that a mass loss of the organic-inorganic nanoporous material (Al-MOF-300C) according to Example 2 is hardly generated up to 400° C., and it can be confirmed as in Example 1 that about 50% of the mass loss is rapidly generated near 600° C. A thermal decomposition behavior difference between the organic-inorganic nanoporous materials according to Example 1 and Example 2 can be confirmed more specifically by DTG curves illustrated in FIG. 4 and FIG. 5.

In this way, the thermal decomposition behavior difference of Example 1 and Example 2 can be seen as a result according to whether there is a high temperature heat treatment process or not after synthesizing the organic-inorganic nanoporous materials. The mass loss is not generated in the initial stage of the temperature increasing process as in the results of TGA/DTG of the organic-inorganic nanoporous material according to Example 2 since unreacted organic materials (mainly organic ligand components) that have not participated in the crystallization reaction and other impurities are thermally decomposed if a separate heat treatment process is performed after synthesizing the organic-inorganic nanoporous material. Further, improvements in moisture adsorption rate and moisture adsorption amount can be expected by removing unnecessary organic materials included in the organic-inorganic nanoporous materials through the heat treatment process. Further, it can be seen through the TGA/DTG analysis that a heat treatment temperature of the organic-inorganic nanoporous material according to the present invention preferably does not exceed 400° C. considering a decomposition temperature of the organic-inorganic nanoporous material.

Example 3

<Preparation of an Organic-Inorganic Nanoporous Material>

An organic-inorganic nanoporous material (Al-MOF-300C) was prepared under the same conditions and by the same method as in Example 2.

<Preparation of an Organic-Inorganic Nanoporous Material-Metal Chloride Hybrid Moisture Adsorption Composition>

An aqueous metal chloride solution was prepared by adding 250 g of $CaCl_2$ as a metal chloride to 500 ml of distilled water, and then powerfully stirring and completely dissolving $CaCl_2$ in distilled water at the same time. After adding 250 g of an organic-inorganic nanoporous material (Al-MOF-300C) and 500 ml of distilled water to the aqueous metal chloride solution, the organic-inorganic nanoporous material (Al-MOF-300C), the distilled water and the aqueous metal chloride solution were strongly stirred for 30 minutes to prepare a mixture. In order to evaporate moisture in the mixture, the mixture was dried for 24 hours in a drying oven which had been set to 150° C. After drying the mixture, a product was obtained. After crushing the product into the form of a powder using a crusher, the powder was vacuum dried for 24 hours to prepare a moisture adsorption composition from which residual moisture had been completely removed.

Comparative Example 1

AQSOA Z01, a commercial moisture adsorbent as a comparative example, was used.

Experimental Example 3

Figure 6:
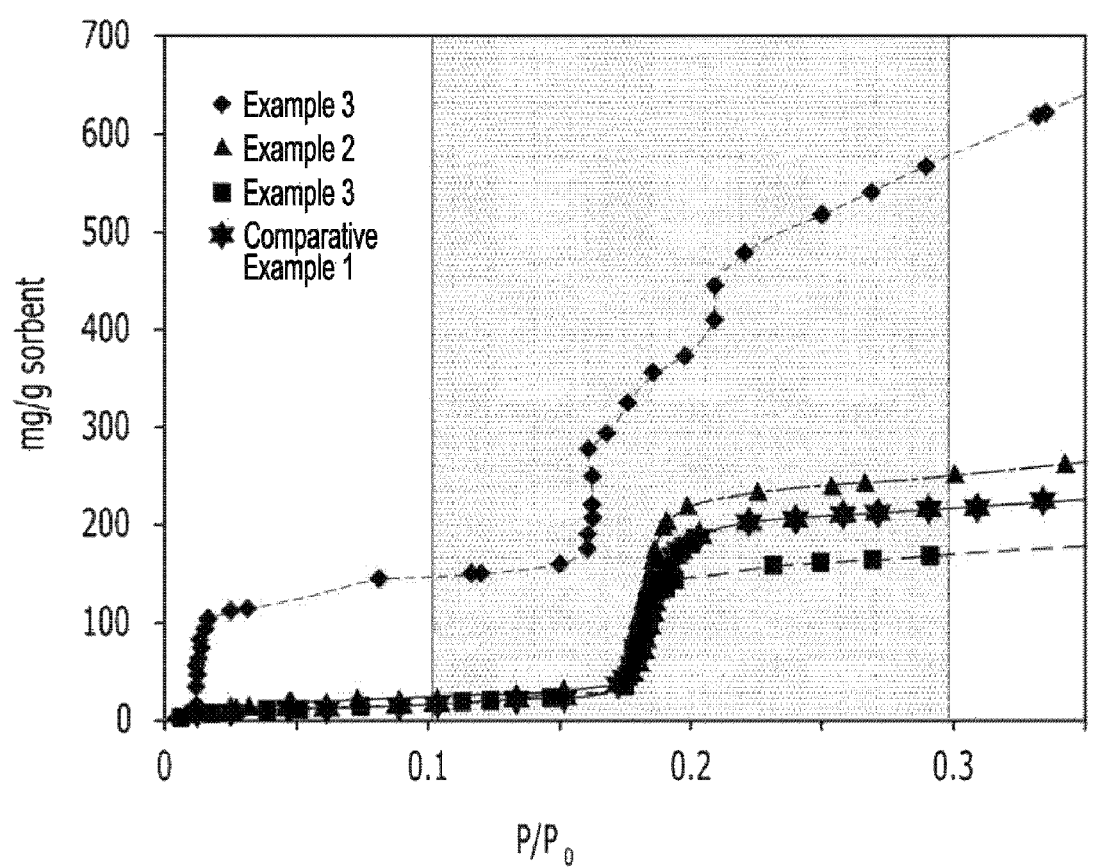
FIG. 6 is a graph illustrating changes in moisture adsorption amounts according to driving pressures of a moisture adsorption composition according to the present invention and a moisture adsorption composition according to the prior art.

To evaluate moisture adsorption properties of the organic-inorganic nanoporous materials and the moisture adsorption compositions prepared according to Examples 1 to 3 and Comparative Example 1, moisture adsorption isothermal analyses were conducted at 25° C., and results of the moisture adsorption isothermal analyses are represented in FIG. 6 and Table 1. FIG. 6 illustrates moisture adsorption amounts according to driving pressures, and the following Table 1 represents maximum moisture adsorption amounts in the driving pressure range ($P/P_0$=0.1 to 0.3).

TABLE 1

| Classification | Maximum moisture adsorption amount [mg/g] |
|---|---|
| Example 3 | 432 |
| Example 2 | 228 |
| Example 1 | 152 |
| Comparative Example 1 | 182 |

Referring to this, it can be confirmed that the moisture adsorption composition according to Example 3 prepared by heat-treating the organic-inorganic nanoporous material at a high temperature and impregnating the metal chloride in the surface of the organic-inorganic nanoporous material has very high moisture adsorption properties in the driving pressure range ($P/P_0$=0.1 to 0.3). It can be seen from this that moisture adsorption properties are improved by combining adsorption properties of the organic-inorganic nanoporous material with hygroscopicity of the metal chloride.

When comparing the moisture adsorption amounts of Example 2 and Example 1 by continuously referring to the drawings, it can be confirmed that the organic-inorganic nanoporous material according to Example 2 prepared by additionally including the heat treatment process has a larger moisture adsorption amount than the organic-inorganic nanoporous material according to Example 1. It can be seen from this that the organic-inorganic nanoporous material according to Example 2 had an improved moisture adsorption amount compared to the organic-inorganic nanoporous material according to Example 1 which did not include the heat treatment process by performing the heat treatment process, thereby decomposing unnecessary organic materials included in the particles of the organic-inorganic nanoporous material.

Moreover, it can be confirmed that the moisture adsorption properties of the moisture adsorption material according to Comparative Example 1 using a commercially available zeolite were remarkable deteriorated that those of the moisture adsorption materials according to Example 2 and Example 3. AQSOA A01 as a porous zeolite moisture adsorbent was used in Comparative Example 1. The organic-inorganic nanoporous material and the porous zeolite moisture adsorbent have a common point that they have a crystalline structure. However, the organic-inorganic nanoporous material has been known to have 3 to 15 times larger surface area and pore volume than the porous zeolite moisture adsorbent. Due to the above characteristics, the organic-inorganic nanoporous material has higher moisture adsorption properties than those of the porous zeolite moisture adsorbent.

Summarizing the above-mentioned Experimental Examples, an organic-inorganic nanoporous material according to the present invention has more excellent moisture adsorption properties than a conventional zeolite moisture adsorption composition, and the moisture adsorption properties can be further improved when preparing the organic-inorganic nanoporous material by additionally including a process of performing heat treatment at a temperature of 200 to 400° C. In addition, the moisture adsorption properties can be maximized by impregnating the metal chloride having hygroscopicity in the particles of the organic-inorganic nanoporous material having the improved moisture adsorption properties, thereby combining adsorption capability with hygroscopicity. Particularly, since an organic-inorganic nanoporous material-metal chloride hybrid moisture adsorption composition according to the present invention has a maximum moisture adsorption amount in a driving pressure range of a dehumidifier, a cooling and heating device, an adsorption type refrigerator, an air conditioner and the like that are application fields of the moisture adsorbent, it is expected that the moisture adsorption composition can function as an effective moisture adsorbent when the moisture adsorption composition is applied to the above-mentioned devices.

Example 4

1. Synthesis of an Organic-Inorganic Nanoporous Material

After putting 1.28 g of aluminum sulfate octadecahydrate [$Al_2(SO_4)_3 \cdot 18H_2O$], 0.45 g of fumaric acid and 0.46 g of NaOH into 13 ml of distilled water, a mixture was obtained by completely dissolving aluminum sulfate octadecahydrate, fumaric acid and NaOH in distilled water while stirring aluminum sulfate octadecahydrate, fumaric acid and NaOH in distilled water for 30 minutes. Then, the mixture was into an autoclave reactor, and a crystallization reaction was performed on the mixture at 110° C. for 32 hours. After completing the reaction, an organic-inorganic nanoporous material Al-Fu was prepared by filtering and purifying a reaction product several times using water and ethanol, and drying the filtered and purified reaction product in a drying oven of 100° C. for 12 hours.

Figure 7:
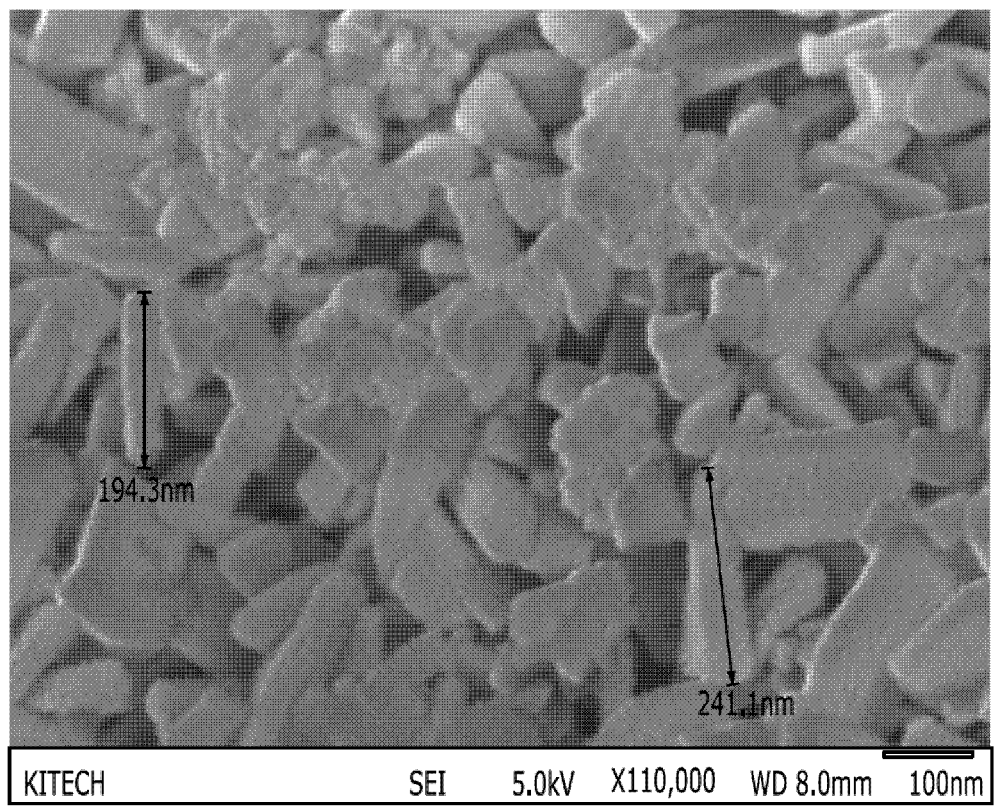
FIG. 7 is an SEM image of an organic-inorganic nanoporous material (Al-Fu) according to an embodiment of the present invention.

An SEM photograph of the organic-inorganic nanoporous material prepared according to the above-mentioned Example 4 is illustrated in FIG. 7.

2. Preparation of an Organic-Inorganic Nanoporous Material-Metal Chloride Hybrid Moisture Adsorption Composition After completely dissolving 5 g of calcium chloride dihydrate in 10 ml of distilled water to prepare an aqueous solution of calcium chloride ($CaCl_2$), and sufficiently dispersing 10 g of an organic-inorganic nanoporous material Al-Fu in 20 ml of distilled water to obtain a dispersion, the dispersion was mixed with the aqueous solution of calcium chloride to prepare a mixture. 5 g of distilled water was additionally added to the mixture, and the mixture was strongly stirred in distilled water for 30 minutes to impregnate $CaCl_2$ in pores of the organic-inorganic nanoporous material Al-Fu. After completing the impregnation process, a solid was obtained by filtering the mixture, thereby removing water and unreacted materials from the mixture. The solid was dried in a drying oven of 150° C. for 24 hours to evaporate moisture from the solid. After completing the drying process, an organic-inorganic nanoporous material-metal chloride hybrid moisture adsorption composition (Al-Fu/CSPM27) was prepared by crushing the dried solid into the form of a powder using a crusher, and vacuum drying the powder for 24 hours, thereby completely removing residual moisture from the powder.

Example 5

After dispersing 5 g of the organic-inorganic nanoporous material Al-Fu according to Example 4 in 10 ml of distilled water to obtain a dispersion, an organic-inorganic nanoporous material-metal chloride hybrid moisture adsorption composition (Al-Fu/CSPM43) was prepared by mixing the dispersion with the aqueous calcium chloride solution according to the above-mentioned Example 4.

Example 6

After dispersing 3.25 g of the organic-inorganic nanoporous material Al-Fu according to Example 4 in 6.5 ml of distilled water to obtain a dispersion, an organic-inorganic nanoporous material-metal chloride hybrid moisture adsorption composition (Al-Fu/CSPM54) was prepared by mixing the dispersion with the aqueous calcium chloride solution according to the above-mentioned Example 4.

Example 7

After dispersing 2 g of the organic-inorganic nanoporous material Al-Fu according to Example 4 in 4 ml of distilled water to obtain a dispersion, an organic-inorganic nanoporous material-metal chloride hybrid moisture adsorption composition (Al-Fu/CSPM65) was prepared by mixing the dispersion with the aqueous calcium chloride solution according to the above-mentioned Example 4.

Comparative Example 2

In order to compare moisture adsorption properties according to whether the metal chloride is impregnated or not, the organic-inorganic nanoporous material Al-Fu according to Example 4 was used as Comparative Example 2.

Comparative Example 3

After dispersing 15 g of the organic-inorganic nanoporous material Al-Fu according to Example 4 in 30 ml of distilled water to obtain a dispersion, an organic-inorganic nanoporous material-metal chloride hybrid moisture adsorption composition (Al-Fu/CSPM20) was prepared by mixing the dispersion with the aqueous calcium chloride solution according to the above-mentioned Example 4.

Experimental Example 4

1. X-Ray Diffraction Analysis of an Organic-Inorganic Nanoporous Material Al-Fu

Figure 8:
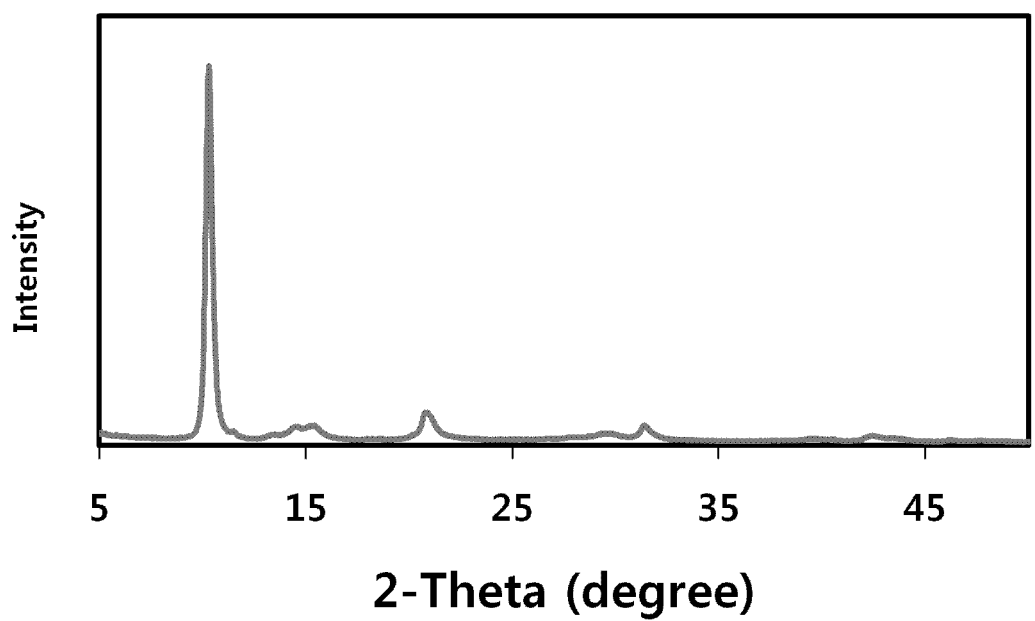
FIG. 8 is a graph illustrating X-ray diffraction analysis results of the organic-inorganic nanoporous material (Al-Fu) according to an embodiment of the present invention.

In order to confirm a crystal structure of the prepared organic-inorganic nanoporous material Al-Fu, an X-ray diffraction analysis was performed, and the X-ray diffraction analysis was carried out in the atmosphere of room temperature using an X-ray diffractometer of Rigaku Corporation. An X-ray diffraction pattern of the organic-inorganic nanoporous material Al-Fu is shown as a peak intensity with respect to a diffraction angle ($2\theta$) in FIG. 8.

A crystal structure of the organic-inorganic nanoporous material (Comparative Example 2) prepared according to Example 4 of the present invention was confirmed, and a lattice constant and an axial angle of the organic-inorganic nanoporous material were respectively derived as follows through the X-ray diffraction analysis:

Lattice constant: a=6.832, b=12.087, c=14.15
Axial angle: $\alpha=\gamma=90°$, $\beta=123.55°$ (symbols a, b and c derived as the X-ray diffraction analysis result indicate X-, Y-, and Z-axis directional lengths of a unit lattice, and $\alpha$, $\beta$, and $\gamma$ indicate angles between X-axis, Y-axis and Z-axis).

2. TGA Analysis of an Organic-Inorganic Nanoporous Material Al-Fu

In order to evaluate thermal stability of the organic-inorganic nanoporous material Al-Fu, thermogravimetric analysis (TGA) was performed. Measurement was carried out at a temperature increasing rate of 10° C./min in a nitrogen atmosphere. A result of the measurement is illustrated in FIG. 9.

Figure 9:
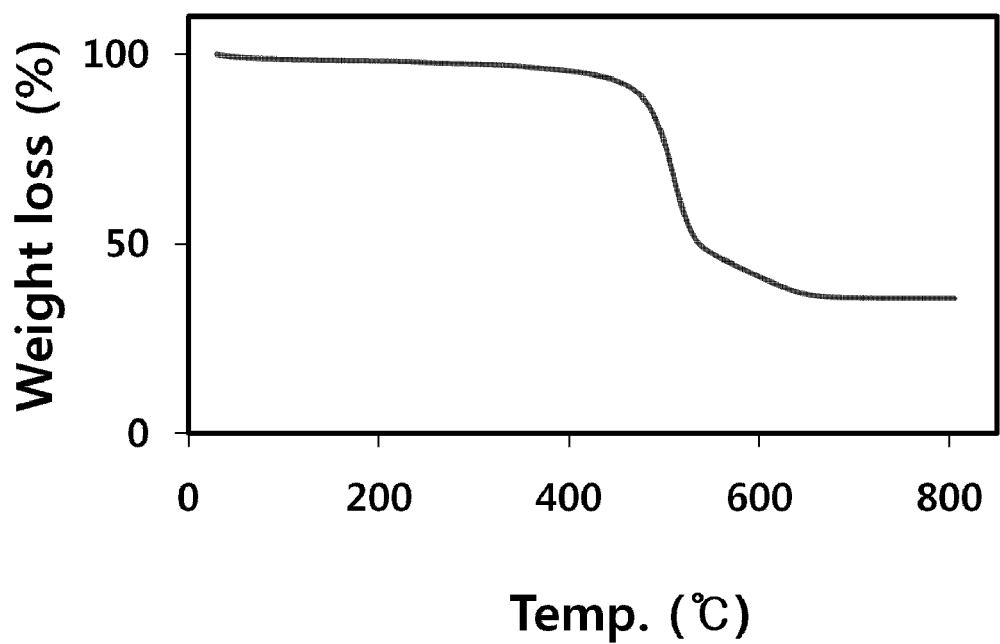
FIG. 9 is a graph illustrating thermogravimetric analysis results of the organic-inorganic nanoporous material (Al-Fu) according to an embodiment of the present invention.

Referring to FIG. 9, it can be confirmed that the organic-inorganic nanoporous material Al-Fu prepared according to an embodiment tends to show a minutely decreased mass from the initial stage of the temperature increasing process, and about 60% of a mass loss is rapidly generated when temperature exceeds 450° C. It can be determined from this that organic material components of the organic-inorganic nanoporous material is thermally decomposed at 450° C. as a starting point, and it can be seen that it may not be preferable to store or use the organic-inorganic nanoporous material at a temperature exceeding 400° C.

3. Specific Surface Area Analysis of the Organic-Inorganic Nanoporous Material Al-Fu In order to analyze specific surface area of the organic-inorganic nanoporous material Al-Fu (Comparative Example 2) prepared in Example 4, adsorption and desorption experiments using nitrogen were conducted. In order to obtain an accurate specific surface area, after removing impurities from the sample by heat-treating a sample at 150° C. for 3 hours, the specific surface area was calculated from a nitrogen desorption and desorption isothermal line by using the Brunauer-Emmett-Teller (BET) method. The specific surface area was calculated as 1,061 m²/g.

4. Moisture Adsorption Isotherm Analysis of Organic-Inorganic Nanoporous Material-Metal Chloride Hybrid Moisture Adsorption Compositions According to Impregnation Amounts of the Metal Chloride In order to check moisture adsorption properties according to a degree in which the metal chloride is impregnated in the pores of the organic-inorganic nanoporous material Al-Fu, the moisture adsorption isotherm analysis was performed at 25° C., and a result of the analysis is represented in the following Table 2.

TABLE 2

| Classification | Content [parts by weight] of $CaCl_2$ with respect to 100 parts by weight of the total composition | Maximum moisture adsorption amount [mg/g] in a driving pressure range ($P/P_0$ = 0.1 to 0.3) |
|---|---|---|
| Example 7 | 65.4 | 737.1 |
| Example 6 | 53.7 | 611.7 |
| Example 5 | 43.0 | 500.7 |
| Example 4 | 27.4 | 442.2 |
| Comparative Example 3 | 20.1 | 379.4 |
| Comparative Example 2 | — | 381.0 |

As represented in Table 2, it was confirmed that the organic-inorganic nanoporous material Al-Fu (Comparative Example 2) in which the metal chloride had not been impregnated in Example 4 had a maximum moisture adsorption amount of 381 mg/g, and it was confirmed that the organic-inorganic nanoporous material Al-Fu (Comparative Example 3) which had been prepared by mixing 20.1 parts by weight of the metal chloride with respect to 100 parts by weight of the total composition had a maximum moisture adsorption amount of 379.4 mg/g, i.e., the organic-inorganic nanoporous material Al-Fu (Comparative Example 3) had slightly lowered moisture adsorption properties compared to the organic-inorganic nanoporous material Al-Fu (Comparative Example 2).

However, it was confirmed that the organic-inorganic nanoporous material Al-Fu (Example 4) which had been prepared by mixing 27.4 parts by weight of the metal chloride with respect to 100 parts by weight of the total composition had a maximum moisture adsorption amount of 442.2 mg/g, i.e., the organic-inorganic nanoporous material Al-Fu (Example 4) had a larger maximum moisture adsorption amount than those of the organic-inorganic nanoporous materials Al-Fu (Comparative Examples 2 and 3), and it was confirmed that the organic-inorganic nanoporous material AL-MOF-300C (Example 3) and the organic-inorganic nanoporous material Al-Fu (Example 7) in which the metal chloride had been impregnated in contents higher than that of the organic-inorganic nanoporous material Al-Fu (Example 4) had larger maximum moisture adsorption amounts than that of the organic-inorganic nanoporous material Al-Fu (Example 4). Particularly, it was confirmed that the organic-inorganic nanoporous material Al-Fu (Example 7) had a moisture adsorption amount of 737.1 mg/g which was about two times larger than those of the organic-inorganic nanoporous materials Al-Fu (Comparative Examples 2 and 3).

It can be determined from these results that moisture adsorption properties are improved by combining adsorption capability of the organic-inorganic nanoporous material with hygroscopicity of the metal chloride. However, the effect is not realized when a content of the metal chloride is low. Moisture adsorption properties may be rather decreased since the metal chloride closes the pores of the organic-inorganic nanoporous material when the content of the metal chloride exceeds a specific value in comparison with the organic-inorganic nanoporous material. The agglomeration of the metal chloride may cause a problem of deteriorating moisture adsorption properties since the metal chloride is agglomerated when the metal chloride is deliquesced by moisture adsorption. Therefore, it may be preferable in the present invention that the metal chloride is included in an amount of 25 parts by weight or larger based on 100 parts by weight of the total composition comprising water, the metal chloride, the organic-inorganic nanoporous material, and the like. It is preferable to mix the metal chloride and the organic-inorganic nanoporous material at a mixing ratio of 10:2.5 to 10:50.

[Example 8] Preparation of a Moisture Adsorption Composition for Surface Coating 1 kg of the organic-inorganic nanoporous material-metal chloride hybrid moisture adsorption composition according to Example 5 was mixed with 1 L of poly(ethylene glycol) methacrylate (PEGMA) as a solvent, and the organic-inorganic nanoporous material-metal chloride hybrid moisture adsorption composition was dispersed in PEGMA as the solvent at a rotation speed of 7,000 rpm for 4 hours by using a high speed emulsifier to obtain a dispersed solution. 75 g of a phenol novolac epoxy based binder resin (YDPN-638A80) was added to the dispersed solution, and the phenol novolac epoxy based binder resin (YDPN-638A80) was dispersed in the dispersed solution at the rotation speed of 7,000 rpm for 30 minutes to obtain a dispersion-complete solution. After putting 40 g of a cycloaliphatic anhydride-based curing agent HN-2200 into the dispersion-complete solution, a composition for surface coating was prepared by stirring the cycloaliphatic anhydride-based curing agent HN-2200 in the dispersion-complete solution at the rotation speed of 7,000 rpm for 5 minutes.

The above-prepared composition for surface coating was coated on a substrate using a dip coating method. First, after grinding the surface of a copper plate using sandpaper and cleaning the ground surface of the copper plate using ethanol, the cleaned copper plate was dried. After fixing the dried copper plate to a dip coater, a coating process was performed by dipping the copper plate fixed to the dip coater into a coating solution in a vertical direction, and then ascending the copper plate dipped into the coating solution at a speed of 3 mm/sec.

When the coating process had been completed on a front surface of the copper plate, a moisture adsorption material was formed on the surface of the substrate by drying the coated copper plate at room temperature for 2 hours, drying the coated copper plate dried at room temperature in an oven of 120° C. for 2 hours, and heat-treating the coated copper plate dried in the oven at 180° C. for 8 hours.

Experimental Example 5

Figure 10:
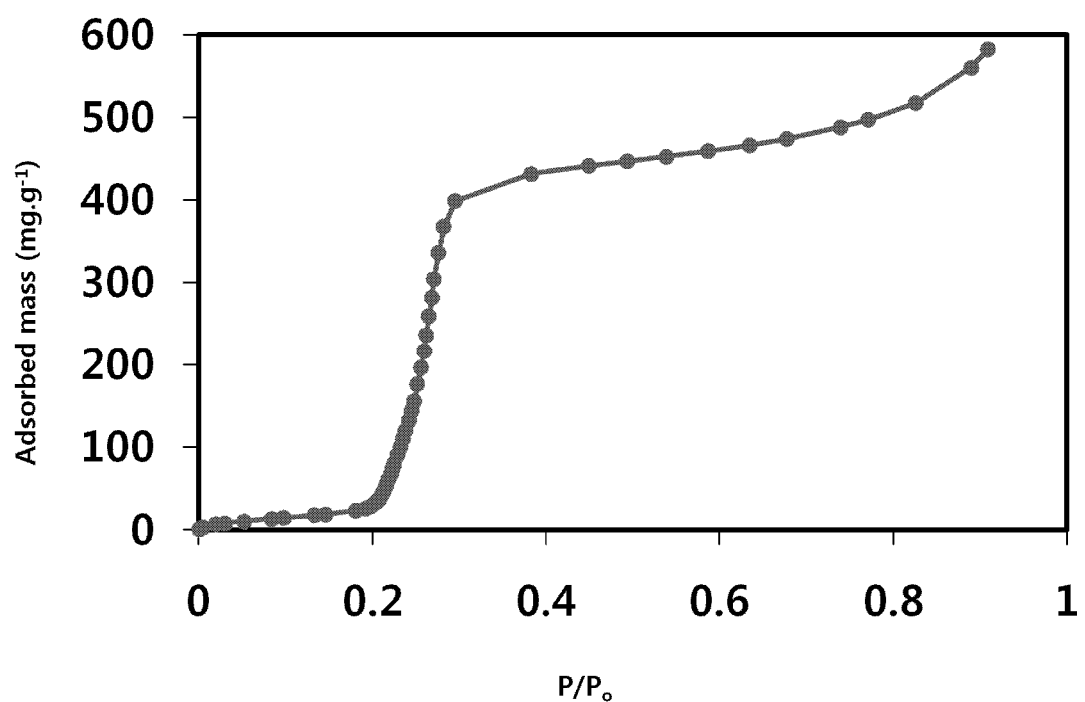
FIG. 10 is a graph illustrating changes in a moisture adsorption amount according to a driving pressure of the organic-inorganic nanoporous material (Al-Fu) according to an embodiment of the present invention.

In order to confirm moisture adsorption properties of a moisture adsorption composition in which the surface of a substrate was coated with the composition for surface coating, a moisture adsorption isotherm analysis was carried out at a condition of 25° C., and a result of the analysis is shown in FIG. 10.

A slight deterioration of adsorption ability may be generated as the porous structure is filled with these materials according as the moisture adsorption composition is mixed with materials such as a binder resin, a curing agent and the like when a moisture adsorption composition having a porous structure is generally prepared into the composition for surface coating. However, it was confirmed that a maximum moisture adsorption amount of the moisture adsorption composition for surface coating according to an embodiment of the present invention 470 mg/g in the driving pressure range ($P/P_0$=0.1 to 0.3), i.e., the moisture adsorption composition had a high moisture adsorption performance even when the moisture adsorption composition was applied as the composition for surface coating. Further, although it was not specifically described in Examples, it was confirmed that the moisture adsorption amount tends to deteriorate as the content of a coating in comparison with the moisture adsorption composition is increased.

Although the present invention has been described along with the accompanying drawings, this is only one of various examples including the gist of the present invention and has an object of enabling a person having ordinary skill in the art to easily practice the invention. Accordingly, it is evident that the present invention is not limited to the aforementioned examples. Accordingly, the range of protection of the present invention should be interpreted based on the following claims, and all of technological spirits within the equivalents of the present invention may fall within the range of right of the present invention by changes, substitutions and replacements without departing from the gist of the present invention.

Furthermore, it is evident that the configurations of some drawings have been provided to more clearly describe configurations and have been more exaggerated or reduced than actual configurations.

What is claimed is:

1. A method of preparing a moisture adsorption composition that is a vacuum dried powder, comprising the steps of:
   (a) synthesizing a nanoporous material by a crystallization reaction between an aluminum precursor and a dicarboxylic acid organic ligand that is isophthalic acid or fumaric acid in a solvent;
   (b) heat-treating to purify the nanoporous material at a temperature ranging from 200 to 400° C. for 30 to 360 minutes to remove the solvent and unreacted constituents and provide a purified nanoporous material;
   (c) preparing a metal chloride solution by dissolving a metal chloride into water;
   (d) mixing the metal chloride solution with the purified nanoporous material to impregnate surfaces of the purified nanoporous material with the metal chloride and provide an impregnated nanoporous material having a weight ratio of the metal chloride to the nanoporous material of 10:2.5 to 10:50, provided that at least 25 parts by weight of the metal chloride are included based on 100 parts by weight of a total composition comprising the water, the metal chloride, and the organic-inorganic nanoporous material;
   (e) drying the impregnated nanoporous material in an oven at a temperature ranging from 100 to 200° C. for a predetermined time to obtain a dried product;
   (f) crushing the dried product to provide a powder; and
   (g) vacuum drying the powder to remove residual moisture and provide the moisture adsorption composition.

2. The method of claim 1, wherein synthesizing the nanoporous material includes the substeps of:
   (i) mixing the solvent; 4 to 40 wt % of the aluminum precursor based on weight of the solvent; and 1 to 10 wt % of the dicarboxylic acid organic ligand based on weight of the solvent to provide a mixture;
   (ii) stirring the mixture to carrying out the crystallization reaction and obtain a product;
   (iii) filtering the product to provide a filtered product;
   (iv) ultrasonically dispersing the filtered product in water to provide a dispersion;
   (v) filtering the dispersion to provide a filtrate; and
   (vi) drying the filtrate to provide the nanoporous material in a powder form.

3. The method of claim 2, wherein the solvent is a solvent selected from the group consisting of water, an alcohol-based solvent, dimethylformamide, diethylformamide, N,N-dimethylformamide, acetonitrile, 1,4-dioxane, chlorobenzene, N-methyl pyrrolidone, tetrahydrofuran, and combinations thereof.

4. The method of claim 1, wherein the aluminum precursor is selected from the group consisting of aluminum nitrate, aluminum chloride, aluminum sulfate, alumina, and combinations thereof.

5. The method of claim 1, wherein the dicarboxylic acid organic ligand is fumaric acid, and wherein the aluminum precursor is mixed with the fumaric acid at a mole ratio ranging from 10:2.5 to 10:40.

6. The method of claim 1, wherein the metal chloride is selected from the group consisting of calcium chloride ($CaCl_2$), magnesium chloride ($MgCl_2$), lithium chloride (LiCl), zinc chloride ($ZnCl_2$), potassium chloride (KCl), sodium chloride (NaCl), and combinations thereof.

7. The method of claim 1, wherein, in step (c), from 5 to 50 wt % of the nanoporous material is added based on 100 parts by weight of the metal chloride solution.

8. A moisture adsorption composition that is a vacuum dried powder, and that is a metal chloride-impregnated, nanoporous material comprising:
   a crystallization reaction product of an aluminum precursor and a dicarboxylic acid organic ligand that is isophthalic acid or fumaric acid and that provides the nanoporous material which has an average particle diameter ranging from 100 to 2,000 nm, a pore size ranging from 0.6 to 1.7 nm, and a maximum moisture adsorption amount defined as an amount of moisture adsorbed per unit weight of the moisture adsorption composition that ranges from 0.2 to 0.9 g/g within a driving pressure ($P/P_0$) that ranges from 0.1 to 0.3; and
   a metal chloride impregnated in nanopores located in the surfaces of the nanoporous material and having a weight ratio of the metal chloride to the nanoporous material of 10:2.5 to 10:50, provided that at least 25 parts by weight of the metal chloride are included based on 100 parts by weight of a total composition comprising the water, the metal chloride, and the organic-inorganic nanoporous material, and that is prepared by a method comprising the steps of:
   (a) synthesizing the nanoporous material by a crystallization reaction between the aluminum precursor and the dicarboxylic acid organic ligand in a solvent;
   (b) heat-treating to purify the nanoporous material at a temperature ranging from 200 to 400° C. for 30 to 360 minutes to remove the solvent and unreacted constituents and provide a purified nanoporous material;
   (c) dissolving the metal chloride into water to prepare a metal chloride solution;
   (d) mixing the purified nanoporous material with the metal chloride solution to provide a mixture and to impregnate surfaces of the purified nanoporous material with the metal chloride and provide an impregnated nanoporous material;

(e) drying the mixture including the impregnated nanoporous material in an oven at a temperature ranging from 100 to 200° C. for a predetermined time to obtain a dried product;

(f) crushing the dried product to provide a powder; and (g) vacuum drying the powder to remove residual moisture and provide the moisture adsorption composition.

9. A moisture adsorption composition that is a vacuum dried powder and that is a metal chloride-impregnated, nanoporous material, comprising:

(a) a crystallization reaction product of an aluminum precursor and a dicarboxylic acid organic ligand that is isophthalic acid or fumaric acid and that is heat treated to provide a purified nanoporous material having an average particle diameter ranging from 100 to 2,000 nm, a pore size ranging from 0.6 to 1.7 nm, and a maximum moisture adsorption amount defined as an amount of moisture adsorbed per unit weight of the moisture adsorption composition that ranges from 0.2 to 0.9 g/g within a driving pressure ($P/P_0$) that ranges from 0.1 to 0.3; and (b) a metal chloride impregnated in nanopores located at least in the surfaces of the purified nanoporous material and having a weight ratio of the metal chloride to the purified nanoporous material of 10:2.5 to 10:50, provided that at least 25 parts by weight of the metal chloride are included based on 100 parts by weight of a total composition comprising the water, the metal chloride, and the organic-inorganic nanoporous material.

10. The moisture adsorption composition of claim 9, wherein the dicarboxylic acid organic ligand is fumaric acid, and wherein the pore size of the nanoporous material ranges from 0.3 to 1.5 nm and the maximum moisture adsorption amount is 0.4 g/g or more.

11. An air conditioner including the moisture adsorption composition according to claim 9.

12. An adsorption-type refrigerator including the moisture adsorption composition according to claim 9.

13. A surface coating including the moisture adsorption composition according to claim 9.

14. The surface coating according to claim 13, including:
from 70 to 96 wt % of the moisture adsorption composition;
from 3 to 29 wt % of an epoxy-based binder resin; and
from 1 to 10 wt % of an epoxy curing agent.

* * * * *